US008818957B2

(12) United States Patent
Sosnosky et al.

(10) Patent No.: US 8,818,957 B2
(45) Date of Patent: *Aug. 26, 2014

(54) EMPLOYING USER-CONTEXT IN CONNECTION WITH BACKUP OR RESTORE OF DATA

(71) Applicant: Microsoft Corporation, Redmond, WA (US)

(72) Inventors: Lara M. Sosnosky, Kirkland, WA (US); Lili Cheng, Bellevue, WA (US); John D. Mehr, Scottsdale, AZ (US); George Moromisato, San Mateo, CA (US); Elissa E. Murphy, Atherton, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/050,342

(22) Filed: Oct. 10, 2013

(65) Prior Publication Data

US 2014/0143209 A1 May 22, 2014

Related U.S. Application Data

(63) Continuation of application No. 12/417,079, filed on Apr. 2, 2009, now Pat. No. 8,583,603.

(51) Int. Cl.
*G06F 17/30* (2006.01)

(52) U.S. Cl.
USPC .......................................................... 707/654

(58) Field of Classification Search
CPC ................. G06F 17/30073; G06F 11/1458
USPC .......................................................... 707/654
See application file for complete search history.

(56) References Cited

U.S. PATENT DOCUMENTS 5,638,509 A 6/1997 Dunphy et al.
7,293,019 B2 11/2007 Dumais et al.
(Continued)

FOREIGN PATENT DOCUMENTS

CN 1592464 A 3/2005
CN 1598817 A 3/2005
(Continued)

OTHER PUBLICATIONS

Office Action; CN App. No. 201080015266.3; mailed Sep. 10, 2013; 6 pages including Concise Statement of Relevance.
"International Search Report", Mailed Date: Oct. 29, 2010, Application No. PCT/US/2010/028893, Filed Date: Mar. 26, 2010, pp. 8. (MS# 326486.02).
"The Virtual Chase: Archival Data and Information"; Feb. 25, 2008; 5 pages.
(Continued)

*Primary Examiner* — Alexey Shmatov
*Assistant Examiner* — Grace Park
(74) *Attorney, Agent, or Firm* — Bryan Webster; Andrew Sanders; Micky Minhas

(57) ABSTRACT

The claimed subject matter relates to architectures for facilitating network-accessible or local backup or restore features in a manner that leverages event-oriented contextual information associated with one or more users of the data to be backed up or restored. In particular, a first restore-based architecture can interface with an associated second backup-based architecture that hosts or maintains a backup data store in order to retrieve a version of the data file that is desired by a user. Additionally, the first architecture can obtain a log of contextual event descriptions that can be aggregated by the second architecture or obtained independently from, e.g., a social networking service or a calendar application associated with the user. Thus, in addition to displaying time and date information associated with the desired version, the first architecture can provide the user with a social context of event from the social services feeds to aid the user in distinguishing between multiple versions of the data file.

20 Claims, 11 Drawing Sheets

(56) References Cited

U.S. PATENT DOCUMENTS

| | | | |
|---|---|---|---|
| 7,346,799 | B2 | 3/2008 | Uhlmann et al. |
| 7,461,221 | B2 | 12/2008 | Palapudi |
| 2004/0068501 | A1 | 4/2004 | Mcgoveran |
| 2006/0031253 | A1 | 2/2006 | Newbold et al. |
| 2006/0129606 | A1 | 6/2006 | Horvitz et al. |
| 2006/0212439 | A1 | 9/2006 | Field |
| 2006/0265434 | A1 | 11/2006 | Kathuria et al. |
| 2007/0186068 | A1 | 8/2007 | Agrawal |
| 2008/0250198 | A1 | 10/2008 | Purchase et al. |

FOREIGN PATENT DOCUMENTS

| | | | |
|---|---|---|---|
| EP | 1693757 | A | 8/2006 |
| JP | 2001519569 | A | 10/2001 |
| JP | 2004252962 | A | 9/2004 |
| JP | 2007536643 | A | 12/2007 |
| WO | 9918522 | A | 4/1999 |
| WO | 2005109251 | A | 11/2005 |

OTHER PUBLICATIONS

Attensa; "Attensa Unveils Feed Server 1.2 Integrating New Publishing, Search and Discovery Tools for Enterprise 2.0 Web Feed Workflows"; Apr. 17, 2006; 2 pages.

Catone, Josh; "Backing up Your Online Life"; Jan. 21, 2009; 3 pages.

Extended European Search Report; EP App. No. 10759245.3; mailed May 10, 2013; 6 pages.

Feedonomics; "Archive for the 'Feed Backup' Category"; May 18, 2008; 5 pages.

Symantec; "Symantec Business Customers Send Their Data Backups to the Cloud"; Jan. 27, 2009; 3 pages.

TechnoFreaks; "Back up and share folder or photos in the cloud" Jan. 27, 2009; 5 pages.

Maruyama Yoko et al.; "Mac OS X v10.5 'Leopard' reverse quick reference;" first edition; Mainichi Communications Co., Ltd.; Jun. 6, 2008; 10 pages, including translation.

Office Action; JP App. No. 2012-503534; mailed Dec. 5, 2013; 3 pages including Concise Explanation of Relevance.

Office Action dated Apr. 18, 2014 in CN Pat. App. No. 201080015266.3, 15 pages, including partial translation.

EMPLOYING USER-CONTEXT IN CONNECTION WITH BACKUP OR RESTORE OF DATA

CROSS-REFERENCE TO RELATED APPLICATION(S)

This application is a continuation of U.S. patent application Ser. No. 12/417,079, filed Apr. 2, 2009, entitled "EMPLOYING USER-CONTEXT IN CONNECTION WITH BACKUP OR RESTORE OF DATA". The entirety of this afore-mentioned application is incorporated herein by reference.

BACKGROUND

Since the launch of the computer revolution decades ago, data has been steadily migrated or been duplicated to exist in electronic or digital form. Today, a very significant portion of personal or other information about many individuals, corporations, or other entities exists in this form. These individuals or entities have come to rely on the utility and convenience of computer-based data storage, since these data stores can be accessed by way of computer networks. Moreover, computer-based data storage has become a popular means for protecting data, as data can be readily duplicated and updated.

Today, numerous backup and restore systems or services exist in the marketplace aimed at both protecting a user's data from loss as well as archiving multiple versions of evolving documents, applications, or other data files. Unfortunately, previous backup services or systems archive data as well as multiple versions of that data strictly according to a time stamp. Therefore, time and date for archived data are typically the only information the user is provided by an associated restore application. Thus, in order for a user to retrieve a particular version from the archive, the user must remember the time/date when the backup occurred, which is often very difficult to do, or manually review the contents, which is inefficient and/or time-consuming.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one or more aspects thereof, comprises an architecture that can employ event-oriented contextual indicia in connection with restoration of backed up data. In accordance therewith and to other related ends, the architecture can communicate with a backup data store in order to retrieve a desired version of a data file associated with the user. The backup data store can be remote from or local to the user and can facilitate backup of multiple versions of the data file.

In addition, the architecture can obtain a log of contextual event descriptions. Each description included in the log can relate to an event associated with the user that occurred substantially contemporaneously with a backup operation associated with various versions of the data file, including the desired version. The descriptions can be obtained from a variety of sources, examples of which can include feeds from social networking services, a calendar application, or the like. Regardless, all or a portion of the log can be presented to the user to provide a social or other contextual view along with the various versions of the data file. Accordingly, while the user might not remember the calendar date of when a desired version was backed up, she may well recall related contextual events that occurred in the same timeframe as a backup operation, of which the descriptions can serve as reminders and/or direct the user to the appropriate file or folder or version.

Additionally or alternatively, a second architecture that can employ event-oriented contextual indicia in connection with archival or backup of data can also be provided. The second architecture can identify data associated with the user that is designated for backup. Further, the second architecture can log contextual event descriptions, potentially aggregated from multiple sources (e.g., feeds, applications . . . ). Further still, the second architecture can archive a most recent version of the identified data to the backup data store. Along with this data, the log of contextual event descriptions occurring approximately during the same time period as archival of the most recent version can be archived as well.

Moreover, one or more contextual event descriptions included in the log can include a reference to the most recent version of the data.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
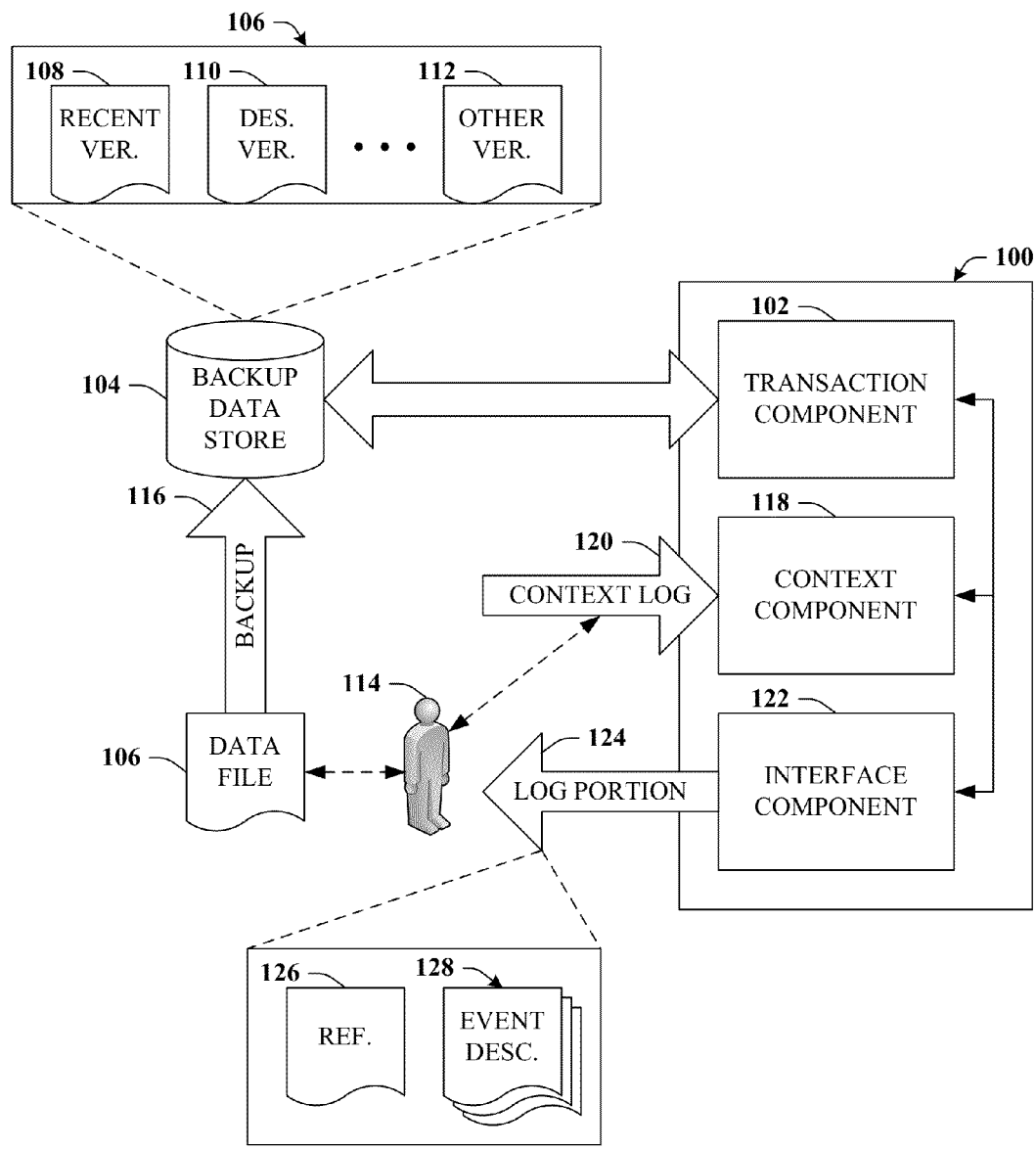
FIG. 1 illustrates a block diagram of a computer-implemented system that can employ event-oriented contextual indicia in connection with restoration of data.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, computer-implemented system 100 that can employ event-oriented contextual indicia in connection with restoration of data is depicted. Generally, system 100 can include transaction component 102 that can communicate with backup data store 104. Backup data store 104 can provide archival or backup storage for data file 106, as well as for multiple other versions of data file 106. Depicted in FIG. 1 are recent version 108 (e.g., the last version saved to backup data store 104), desired version 110 (discussed infra), and one or more other versions 112, however, it should be appreciated that substantially any number of versions of data file 106 can exist in backup data store 104. It should also be appreciated that data file 106 can reside in a computing device (not shown) associated with user 114 such as a personal computer, laptop, phone or the like. Likewise, all or portions of system 100 can also reside in or be operatively coupled to such a computing device associated with user 114.

Thus, backup data store 104 can be hosted by a network-accessible backup service (illustrated in connection with FIG. 4). However, it should be appreciated that data file 106 as well as system 100 can alternatively be included in devices associated with the backup service that hosts backup data store 104, e.g., when hosting data for user 114 in addition to backup or restore services. Therefore, while many examples included herein assume data file 106 and system 100 exists on a device local to user 114, it should be appreciated that other topologies are possible. Moreover, it should be understood that data file 106 is intended to be representative of substantially any data associated with user 114 or portion thereof, even if not structured as a discrete file. For example, data file 106 can be representative of substantially any file, folder, directory or another data structure or even a data stream.

Transaction component 102 can communicate with backup data store 104 in order to, inter alia, retrieve desired version 110 of data file 106. In other words, transaction component 102 can facilitate a restore of some previously backed up version (e.g., by way of backup operation 116) in which the previously backed-up version is a particular version, among multiple versions, desired by user 114. Thus, whether locally stored on a user device, or maintained by a disparate service, a current data file 106 interacted with by user 114 can be restored to a previously archived desired version to facilitate interaction with the desired version.

In addition, system 100 can also include context component 118 that can obtain log 120 of contextual event descriptions. In one or more aspects of the claimed subject matter, each contextual event description included in log 120 can describe a respective event that relates to a context of user 114 near to a time when data file 106 was backed up by way of backup operation 116. Hence, for each backed up version of data file 106 existing in backup data store 104, log 120 can provide a contextual record from the perspective of user 114. Thus, unlike previous backup/restore systems or services that provide only a time and date of various existing archived versions of a given data file, the claimed subject matter can provide additional context that can be very relevant to user 114 in understanding or remembering contents or features associated with the various version 108-112. Additional features, examples, and/or illustrations in connection with contextual event descriptions are further detailed in connection with FIGS. 2 and 3, infra.

Furthermore, system 100 can include interface component 122 that can output at least a portion of contextual log 120. The selected portion is denoted herein by reference numeral 124, and can be output by interface component 122 to a display associated with user 114 or a device thereof, e.g., in order to provide the user additional context in determining desired version 110 from amongst several backed up versions of data file 106, an example of which is provided with reference to FIG. 3. Log portion 124 can include reference 126, which can be an active link to desired version 110. Furthermore, log portion 124 can include at least one contextual event description 128 that describes an underlying event that occurred during a period of time substantially contemporaneous with backup operation 116 performed in connection with desired version 110.

In other words, while context log 120 can include contextual event descriptions associated with all backed up versions (e.g., versions 108-112) of data file 106, log portion 124 can be limited to those contextual event descriptions 128 associated specifically with desired version 110 (e.g., descriptions with underlying events that occurred during the period of time that includes the backup of desired version 110). Contextual event descriptions 128 as well as those included in the broader set of context log 120 can originate from a variety of sources, which is further discussed in connection with FIG. 2.

Figure 2:
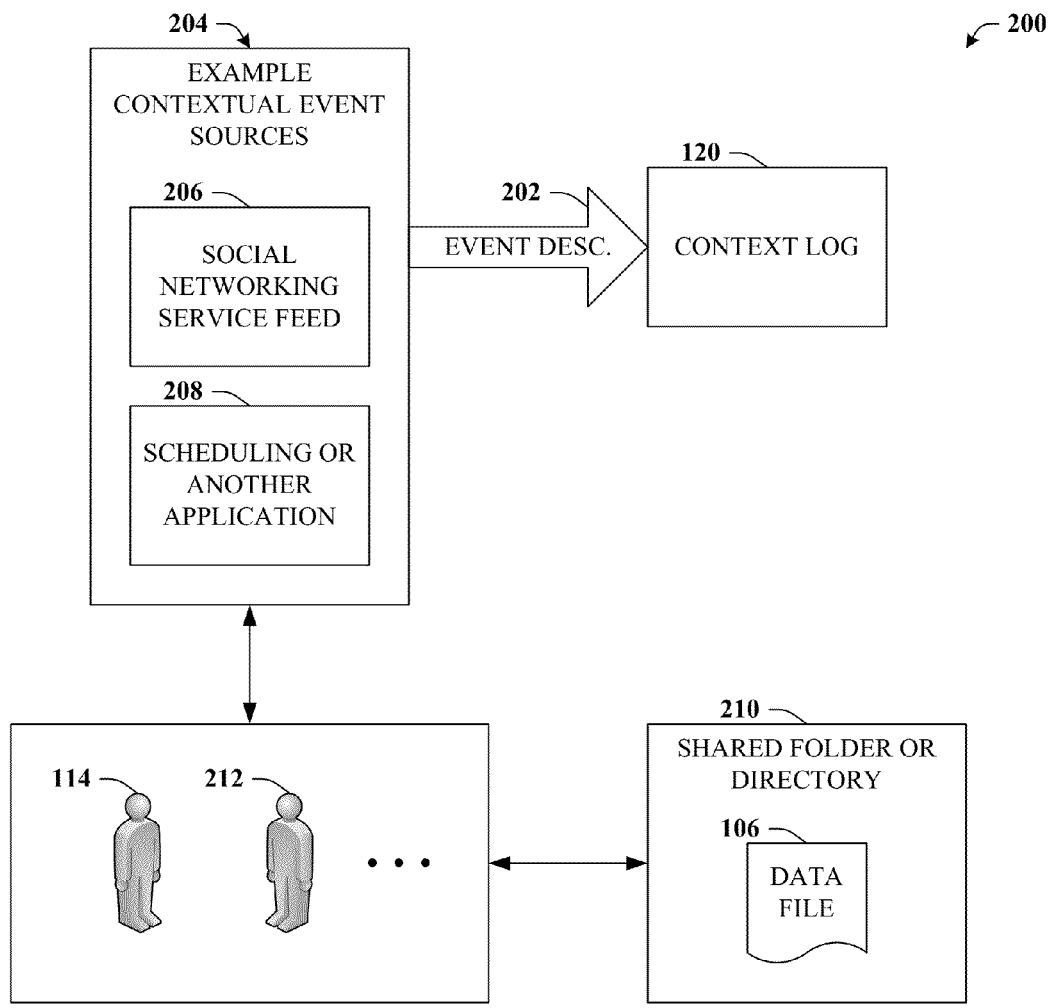
FIG. 2 depicts a block diagram of a system that illustrates various examples of contextual event sources as well as aspects associated with shared user access in connection with the data file.

Turning now to FIG. 2, system 200 that illustrates various examples of contextual event sources as well as aspects associated with shared user access in connection with the data file is provided. In particular, as discussed in connection with FIG. 1, various contextual event descriptions 202 can be obtained (e.g., by context component 118) to create context log 120. Appreciably, these contextual event descriptions 202 can be obtained either directly or indirectly and from multiple sources, a few illustrations of which are denoted by examples 204. In one or more aspect of the claimed subject matter, one or more contextual event descriptions 202 can be obtained from social networking service feed 206 that is associated with or subscribed to by user 114.

Today, social networking services are widely known and very popular, and many of the more popular examples provide some type of content feed (e.g., social networking service feed 206) that is available to users of the service in some form, either displayed on a content page or delivered in the form of an email or by way of some messaging format or protocol. Typically, these feeds are provided in the form of Really Simple Syndication (RSS) or Atom (e.g., Atom Syndication Format or Atom Publishing Protocol), but other formats, including proprietary formats, do exist and can be employed in connection with the claimed subject matter.

RSS and Atom feeds (RFC 4287 and RFC 5023) include families of web-based feed formats specified in extended markup language (XML) and utilized to publish frequently updated works, such as blogs, entries, news, and so on. Thus, both formats can readily be employed to provide contextual information about users in a manner that can be frequently updated and disseminated. In fact, such contextual snap-shots about an individual's life are one reason many social networking services employ these content feeds and potentially why those services are so popular today. However, in addition to providing a social view of the individual, these contextual snaps-shots can relate to memorable events that are often easier to remember than the date or time of the event. For example, an individual might not remember the calendar day for a certain event, but might recall that it occurred at about the same time as another event.

In accordance therewith, potentially upon authorization from user 114 who is also a user of the underlying social networking service, the claimed subject matter can readily obtain contextual event descriptions 202 from social networking service feed 206 when such feeds are in RSS, Atom, or substantially any public or known format. In the case of proprietary or unknown formats, feeds can still be employed by advanced negotiation with the underlying social networking service to obtain and understand or interpret feeds 206 on behalf of user 114.

In one or more aspects of the claimed subject matter, another example of contextual event sources 204 can be various applications 208, typically a scheduling application such as a calendar application, and itinerary or to-do list application, an email client, and so on. Appreciably, in the case of feed 206, the information employed to populate contextual event descriptions 202 will usually be received from the underlying social networking service, whereas in the case of applications 208, the information employed to populate contextual event descriptions 202 can be received directly from a machine or device associated with user 114.

Regardless, it should be appreciated that in many cases data that undergoes revisions is often revised by more than one party. Therefore, while the description thus far has been directed to a simplified case in which data file 106 is owned or exclusively updated by user 114, additional aspects relating to multi-party use/access and/or collaboration can now be introduced. In particular, consider the case in which data file 106 is an enterprise file that has undergone numerous collaborative updates and that is shared or resides in shared folder or directory 210 in which, in addition to user 114, one or more additional parties (represented by second user 212) have read, write, or update privileges.

In that case, one or more contextual event description 202 can be obtained from a social networking service feed substantially similar to that described above, but one associated with or subscribed to by second user 212, notwithstanding the affiliations of user 114. Appreciably, the above applies for substantially any source 204. Thus, contextual event descriptions 202 can be obtained from application 208 (or another source 204) associated with or employed by second user 212. Accordingly, as applicable to the features described herein, context associated with backup of data file 106 can be expanded in scope to substantially any or all individuals who can modify data file 106.

Figure 3:
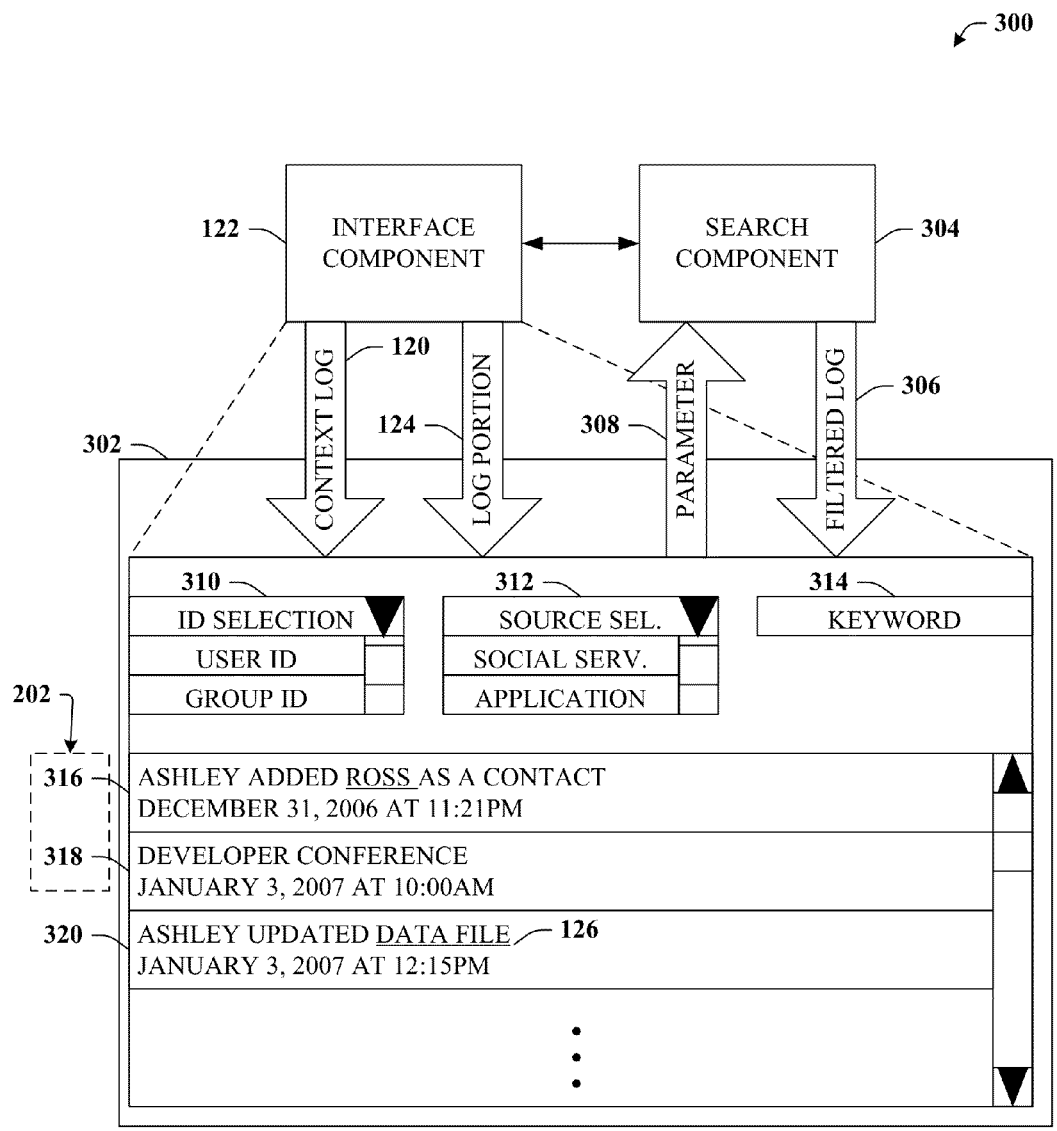
FIG. 3 provides block diagram of a system that illustrates an example output provided at least in part by interface component for facilitating event-oriented contextual indicia in connection with restoration of data.

With reference now to FIG. 3, system 300 that illustrates an example output provided at least in part by interface component for facilitating event-oriented contextual indicia in connection with restoration of data is depicted. Generally, system 300 can include interface component 122 that can output log portion 124 as substantially described supra, wherein log portion 124 can be a subset of context log 120. This output (or the full context log 120) by interface component 122 can be presented to a client displayed by display 302, which can be substantially any display device associated with user 114 or users 212.

In addition, system 300 can include search component 304, which can also be included in or operatively coupled to system 100 detailed in connection with FIG. 1. Search component 304 can further filter context log 120 (or log portion 124) to provide filtered portion 306, wherein the filtering can be based upon parameter 308 input to a portion of interface component 122 (e.g., a user-interface) displayed by display 302. Appreciably, interface component 122 can facilitate output (e.g., to display 302) of filtered portion 306.

Parameter 308 input to interface component 122 can be based upon ID selection 310. By way of illustration ID selection 310, depicted here in the form of a drop-down menu can relate to a user ID (e.g., name or user name for a particular user 114, 212). Likewise, ID selection 310 can relate to group ID 312, which can include multiple users 114, 212 who are part of a team, organization, or another group or classification. In the former case, search component 304 can omit all contextual event descriptions 202 included in context log 120 from filtered portion 306 except those associated with the input user ID. Similarly, in the case of group ID, search component 304 can include only contextual event descriptions 202 that relate to the members of the selected group. In either case, interface component 122 can present filtered log 306.

Additionally or alternatively, parameter 308 can be based upon a contextual event source selection 312, which is also depicted as a drop-down menu but, like ID selection 310 can be implemented in substantially any suitable manner. Source selection 312 can allow user 114, 212 to select contextual event descriptions 202 that originate from social networking services or from applications, either as a group or singular or specific social networking services or applications. Based upon this selection, search component 304 can filter results in a suitable manner and interface component 122 can present filtered log 306.

Furthermore, parameter 308 can relate to keyword 314, wherein search component 304 can facilitate output of results of a search for that keyword by way of filtered log 306. It should be underscored that filtered log 306 (or any results obtained by search component 304) need not be rigidly filtered based upon parameter 308. Rather, whether in connection with ID selection 310, source selection 312, keyword 314, or some other criterion, filtered log 306 can (and typically will) include results that do not satisfy the criteria of parameter 308. Specifically, based upon parameter 308, search component 304 can identify a number of hits or matches, all or a subset of which can be included in filtered log 306. In addition to those hits or matches, contextual event descriptions 202 that were logged at about the same time as the hits or matches can be included in filtered log 306 as well.

This contemporaneous period of time can extend in both directions, before or after the matching event description was logged, and can be the same in either direction, or a different length of time for event descriptions that occurred before the matching event description versus those that occurred afterwards. Either way, the actual length of the period can be based upon defaults, user settings or preferences, or dynamically inferred (potentially in combination with defaults, settings, or preferences) based upon a size of the data sets, the age of the results included in filtered log 306 or other factors. For instance, if many contextual event descriptions 202 exist at or near the time of a hit or match included in filtered log 306, then the contemporaneous period of time in which descriptions that do not expressly match parameter 308 can be relatively small such as a day or a few hours. On the other hand, if very few contextual event descriptions 202 exist at or near the time of a hit or match, then the contemporaneous period of time can be larger, say, several days or weeks. Additionally or alternatively, if the matching description 202 was very distant from the present date, then the contemporaneous period of time can be expanded commensurately.

To provide a concrete example of the above, consider Ashley (e.g., user 114), who has been working on a particular document (e.g., data file 106) at her job along with several members of her team. After several months and numerous revisions to the document, Ashley and her team decide the current direction for the project is a dead end, so they want to roll back the current version of the document to a previous version (e.g., desired version 110) before the team decided to pursue the current direction. Ashley is familiar with the contents of the desired previous version but, as is often the case, she cannot remember when that version was last backed up.

Thus, with previous backup/restore systems or services, Ashley would be forced to go to a backup folder or otherwise access the archive, and then manually open each previous version in succession, manually reviewing each previous version until she finds desired version 110 by way of this manual process.

In contrast, by employing the claimed subject matter, Ashley can now, e.g., open an associated restore package or application, and input parameter 308, in this case keyword 314 that is the name of data file 106 (e.g., "data file"). Search component 304 can identify all references to the data file (e.g., recorded indicia that the data file was backed up, modified, or accessed). However, further context can be provided as well by displaying selected contextual event descriptions 202 that occurred at about the same time. While many different displayed items can match keyword 314 (e.g., each time the data file was modified), for the sake of brevity, only one such item is depicted here denoted by reference numeral 320.

Reference numeral 320 describes the desired version 110 that Ashley and her team intend to roll back to. However, continuing the example, Ashley might not be aware the listed version is the one she wants merely from the timestamp. Therefore, for additional context, elements 316 and 318 (example contextual event descriptions 202) are also provided. For instance, suppose that while Ashley is not certain of the date, she remembers that a friend name Ross provided some insight that led to the original direction of the project, but was later abandoned for the new direction that is now considered a dead end. Upon reviewing the displayed filtered log 306, Ashley recalls that she met Ross at a New Years' Eve party hosted by her employer and they discussed the project over coffee the next day. Thus, Ashley can be more certain that element 320 is indeed desired version 110 based upon this additional context.

Appreciably, element 316 represents an example of contextual event description 202 that likely originated from a social networking service, as it indicates that Ashley added Ross as a friend/contact. As another example, one in which source 204 is instead an application, specifically a calendar application. Element 318 provides such an example. For instance, suppose Ashley's calendar recorded her expected attendance to a certain conference. Based upon element 318, Ashley might recall that she was at the developers' conference when she submitted the last version based upon the original premise before switching gears to the new direction that was ultimately deemed to be a dead end. Hence, she can readily identify element 320 as being related to the desired version 110.

Moreover, as indicated supra, log portion 124, or in this case, filtered log 306 can include reference 126 to desired version 110 of data file 106. Thus, desired version 110 can be accessed directly from a user-interface provided by interface component 122. For example, by clicking on reference 126, desired version 110 can be accessed, previewed, and/or restored. In particular, transaction component 102 can replace data file 106 with desired version 110 upon selection of reference 126 by way of interface component 122. In one or more aspects of the claimed subject matter, transaction component 102 can further facilitate or request a backup of data file 106 prior to a restoration of desired file 110.

Figure 4:
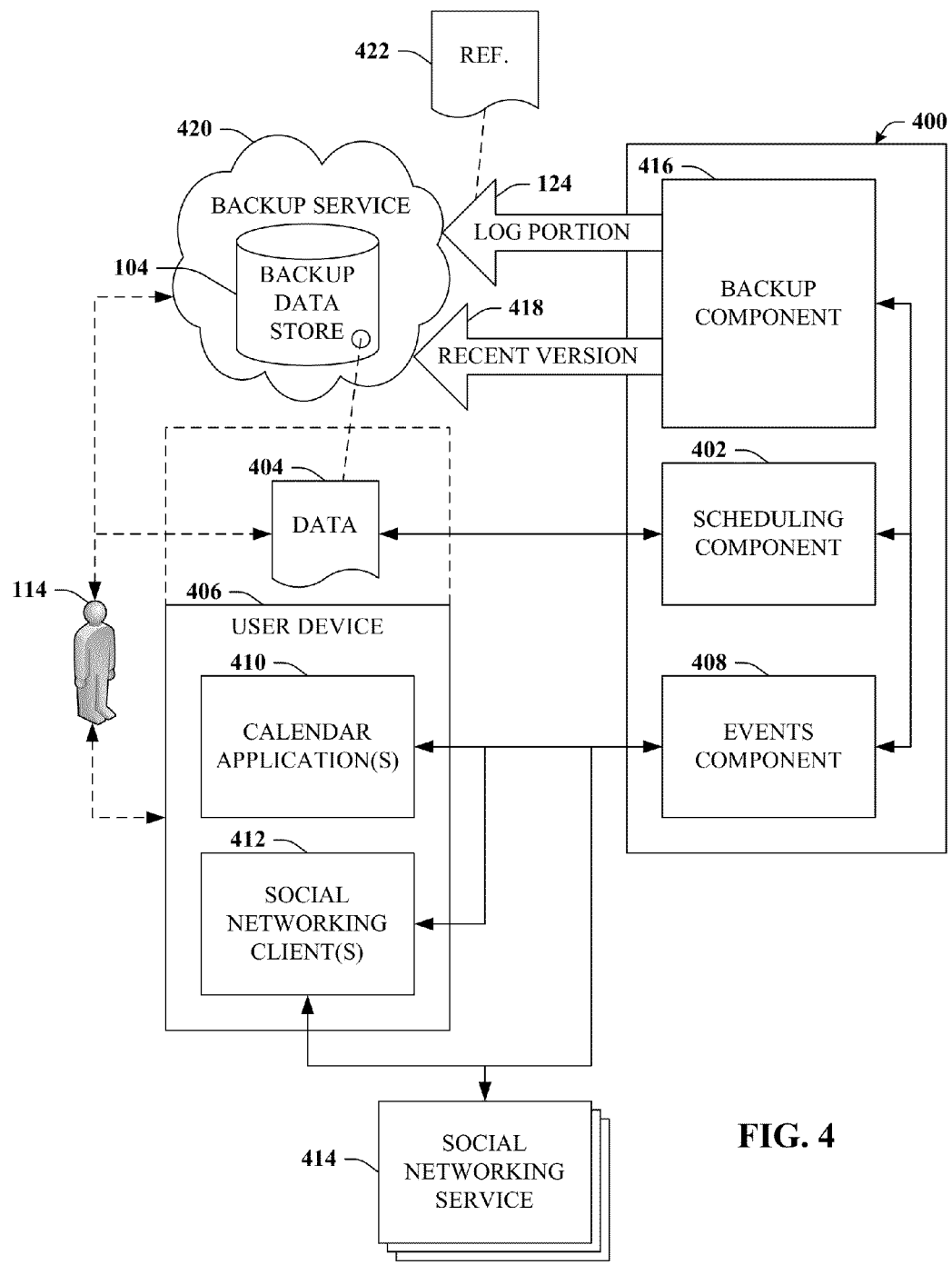
FIG. 4 provides block diagram of a system that can employ event-oriented contextual indicia in connection with archival of data.

Referring now to FIG. 4, system 400 that can employ event-oriented contextual indicia in connection with archival of data is provided. As with system 100, all or portions of system 400 can be included in a device associated with user 114 (e.g., user device 406), exist as part of a network-accessible backup service (e.g., backup service 420), or be provided as part of a separate network service. While the above discussion focused more specifically on restoration of data file 106, an examination of the archival or backup features can now be described. In accordance therewith, system 400 can include scheduling component 402 that can identify data 404 (e.g., a file, folder, directory, or another data structure or stream) associated with user 114 (or user 212) that is designated for backup. Data 404 can be designated for backup by way of, e.g., express selection by user 114, according to a backup scheduler component, according to changes observed in data 404 and so on. As discussed previously, data 404 can reside on user device 406 (associated with user 114, 212), however, such a situation is optional as data 404 can be located elsewhere such as within backup data store 104 of backup service 420 or a disparate data hosting service.

In addition, system 400 can include events component 408 that can log contextual event descriptions. Thus, events component 408 can be responsible for composition or construction of context log 120 detailed previously in connection with FIGS. 1-3 that is obtained by context component 118. These contextual event descriptions can be obtained by way of transactions with user device 406, in particular with various applications 410 or social networking clients 412; as well as from social networking services 414 that are associated with clients 412. Accordingly, in one or more aspects of the claimed subject matter, events component 408 can aggregate these contextual event descriptions from multiple social networking service 414 news feeds. Additionally or alternatively, events component 408 can aggregate the contextual event descriptions from one or more scheduling or itinerary applications 410.

Furthermore, system 400 can also include backup component 416 that can effectuate an archive or backup of most recent version 418 of data 404 that is identified as being designated for backup. Such an archive of data 404 can be substantially similar to backup operation 116 discussed supra in connection with archival of data file 106. In addition, backup component 416 can further archive a log of contextual event descriptions (e.g., log portion 124 or context log 120 discussed in connection with FIGS. 1-3) occurring approximately during a same time period as archival of most recent version 418. In one or more aspects of the claimed subject matter, the log of contextual event descriptions can include one or more contextual event descriptions that provides reference 422 to most recent version 418.

Figure 5:
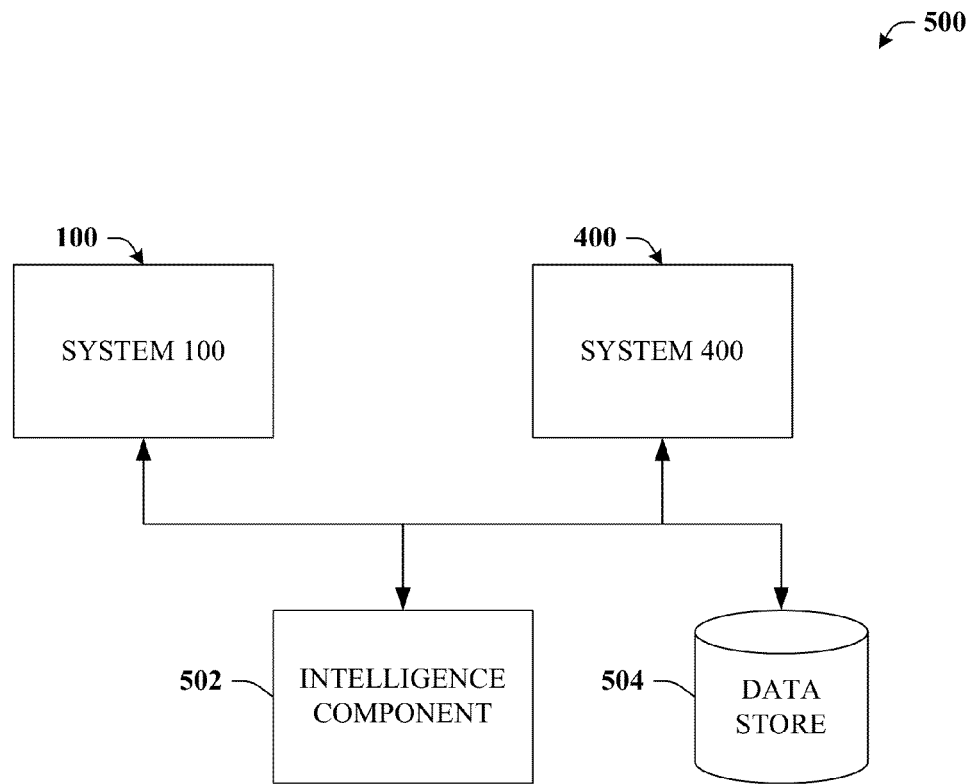
FIG. 5 is a block diagram of a system that can provide for or aid with various inferences or intelligent determinations.

Turning now to FIG. 5, system 500 that can provide for or aid with various inferences or intelligent determinations is depicted. Generally, system 500 can include all or portions of system 100, such as transaction component 102, context component 118, interface component 122 as well as search component 304 as substantially described herein. Likewise, system 500 can also include all or portions of system 400, such as scheduling component 402, events component 408, or backup component 416. In addition to what has been described, the above-mentioned components can make other intelligent determinations or inferences, either individually or in connection with or at the direction of other components described herein.

Likewise, model 112 or efficient availability component 116 can intelligently determine or infer the frequency of access based upon content-specific models or data sets, client 106 behavior or preferences and so forth. Also, model 112 or data integrity component 118 can intelligently determine or infer when to run or schedule errors scan 214 based on the integrity threshold as well as scheduled or observed resource utilization. Still further, model 112 or data logistics component 120 can intelligently determine or infer when to employ emergency reserve store 230, while efficient storage component 122 can intelligently determine or infer content-specific optimizations, e.g., when applying optimizations to similar content types or the like.

As one example, one or more of the above-mentioned components can intelligently determine or infer the contemporaneous period of time (e.g., the length of time, either before or after a backup operation, in which contextual event descriptions can be associated in some way with the underlying data that was or is being backed up. Additionally or alternatively, an intelligent determination or inference can be employed for deciding which obtained contextual event descriptions should be logged and/or presented, which can rely upon assigning various weights to description types and can further be a function of the user 114, 212 who interacts most often with data. Appreciably, any of the foregoing inferences can potentially be based upon, e.g., Bayesian probabilities or confidence measures or based upon machine learning techniques related to historical analysis, feedback, and/or previous other determinations or inferences.

In addition, system 500 can also include intelligence component 502 that can provide for or aid in various inferences or determinations. In particular, in accordance with or in addition to what has been described supra with respect to intelligent determination or inferences provided by various components described herein. For example, all or portions of system 100 or system 400 can be operatively coupled to intelligence component 502. Additionally or alternatively, all or portions of intelligence component 502 can be included in one or more components described herein. Moreover, intelligence component 502 will typically have access to all or portions of data sets described herein, which can optionally be stored in data store 504.

Data store 504 is intended to be a repository of all or portions of data, data sets, or information described herein or otherwise suitable for use with the claimed subject matter, which can be distinct from backup data store 104. Data store 504 can be centralized, either remotely or locally cached, or distributed, potentially across multiple devices and/or schemas. Furthermore, data store 504 (as with backup data store 104) can be embodied as substantially any type of memory, including but not limited to volatile or non-volatile, sequential access, structured access, or random access and so on. It should be understood that all or portions of data store 504 can be included in system 100 or system 400, or can reside in part or entirely remotely from systems 100, 400.

In accordance with the above, in order to provide for or aid in the numerous inferences described herein, intelligence component 502 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

FIGS. 6, 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
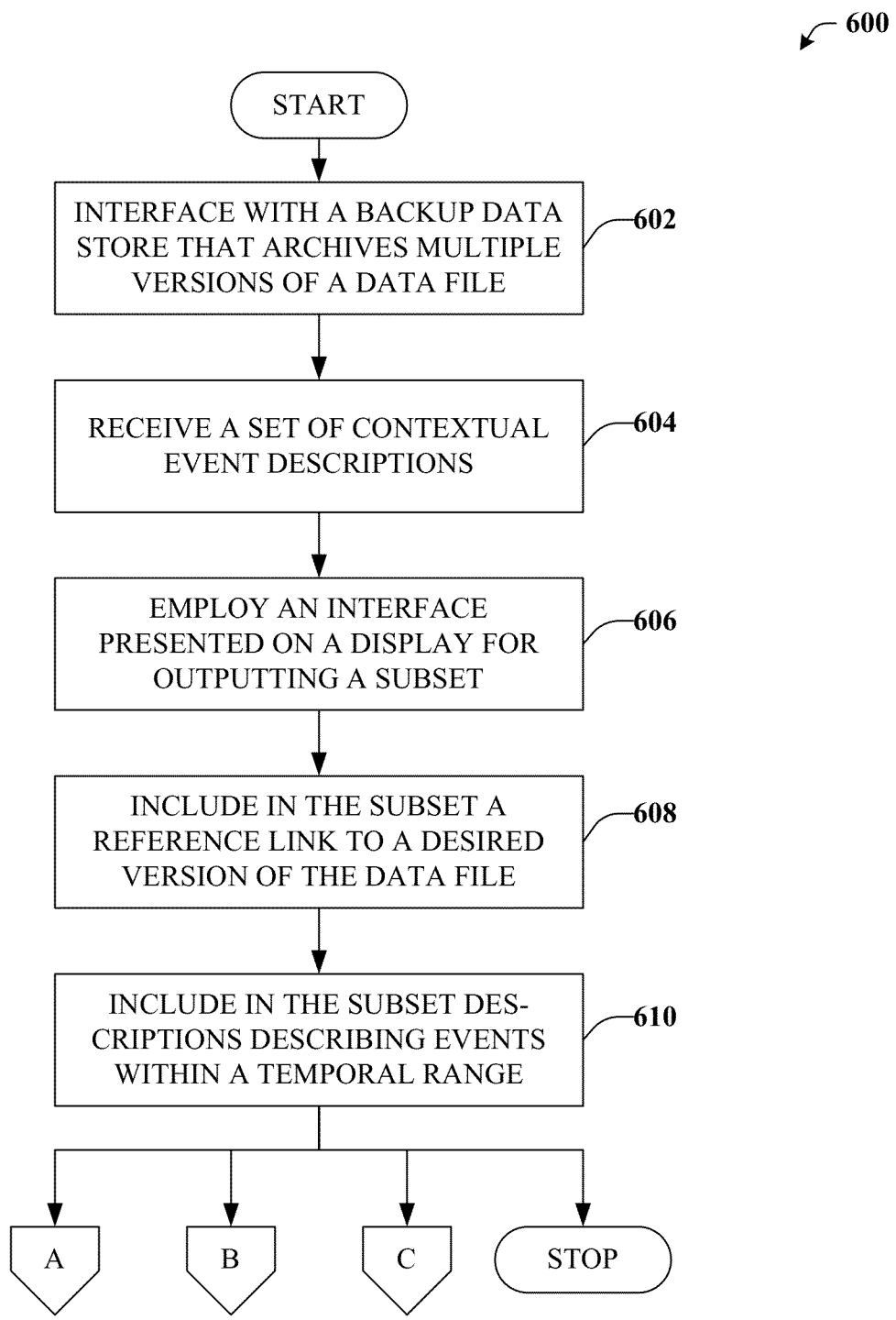
FIG. 6 depicts an exemplary flow chart of procedures that define a method for employing event-oriented contextual indicia in connection with archival or restoration of data.

With reference now to FIG. 6, exemplary computer implemented method 600 for employing event-oriented contextual indicia in connection with archival or restoration of data is provided. Generally, at reference numeral 602, interface with a backup data store that archives multiple versions of a data file associated with a user can be provided. For example, the backup data store can be interfaced by way of any suitable wide area network (WAN) or local area network (LAN), or in some cases can reside on a local machine or device with respect to the user. In the first case, the backup data store can be maintained by a network- or cloud-accessible backup/ restore service, while in the second case, the backup data store can be employed by a local backup/restore application.

In addition, at reference numeral 604, a set of contextual event descriptions can be received, various aspects or features of which are detailed herein. Next to be described, at reference numeral 606, a graphic user interface that is presented on a display can be employed for outputting at least a subset of the set of contextual event descriptions. In accordance therewith, at reference numeral 608, a reference link to a desired version of the data file can be included in the subset. Moreover, at reference numeral 610, one or more contextual event descriptions describing an underlying event that occurred during a temporal range approximately contemporaneous with a backup of the desired version can be included in the subset. For example, contextual indicia, often associated with social events or other contexts that can be memorable for a user (and that occurred at about the same time as the backup) can be presented.

Figure 7:
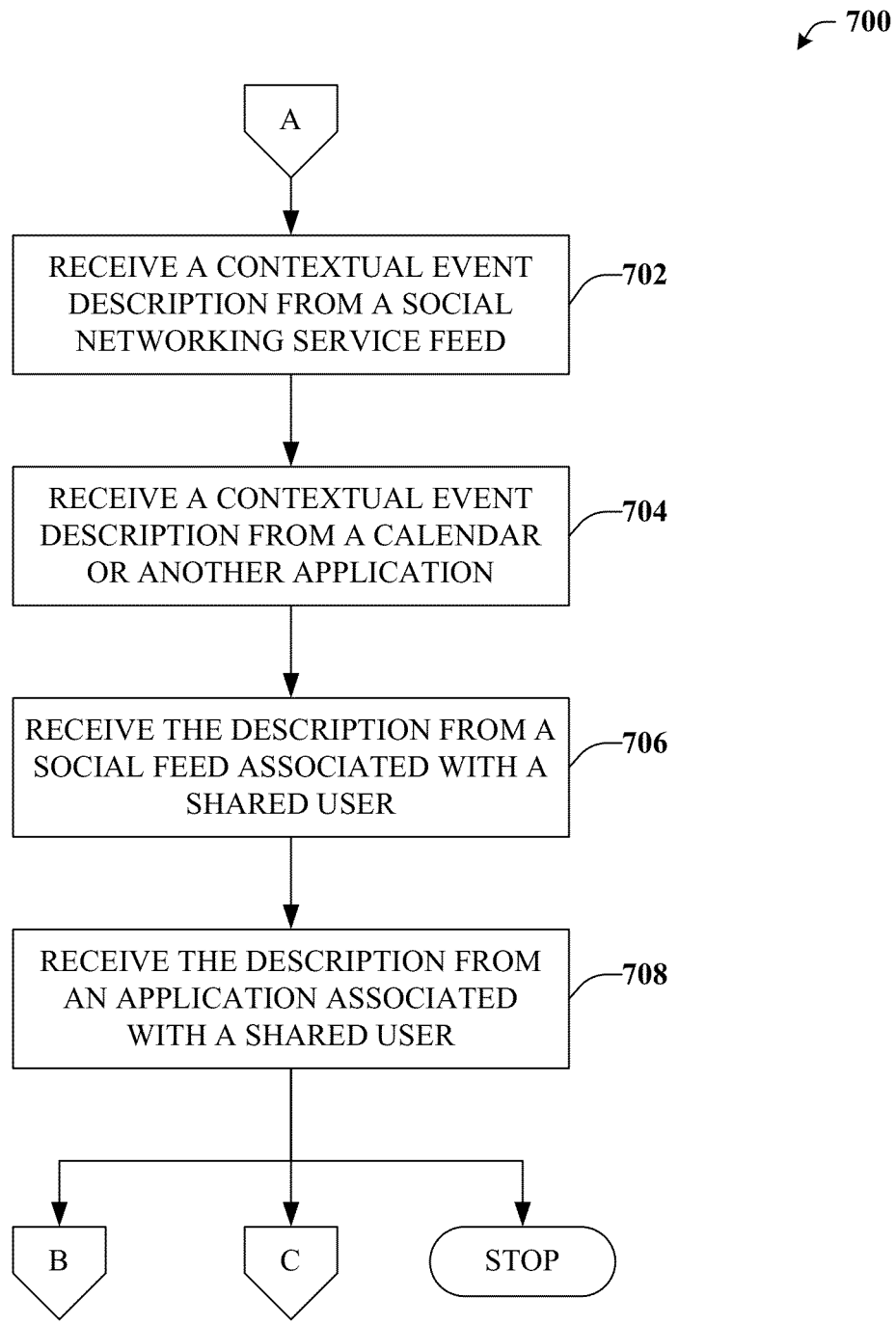
FIG. 7 is an exemplary flow chart of procedures that define a method for providing additional features in connection with contextual event descriptions.

Referring to FIG. 7, exemplary computer implemented method 700 for providing additional features in connection with contextual event descriptions is depicted. At reference numeral 702, at least one contextual event description included in the subset introduced at reference numeral 606 of FIG. 6 can be received from a feed provided by a social networking service associated with the user. Additionally or alternatively, at reference numeral 704, at least one contextual event description included in the subset can be received from an application associated with the user. The application can be, e.g., a calendar application, a scheduling application, an itinerary applications or the like.

Similarly, at reference numeral 706, at least one contextual event description included in the subset can be received from a feed provided by a social networking service associated with a second user, wherein the second user is granted shared access, update, or other data privileges in connection with the data file. Additionally or alternatively, at reference numeral 708, at least one contextual event description included in the subset can be received from an application associated with a second user with whom data privileges in connection with the data file are shared with the second user.

Figure 8:
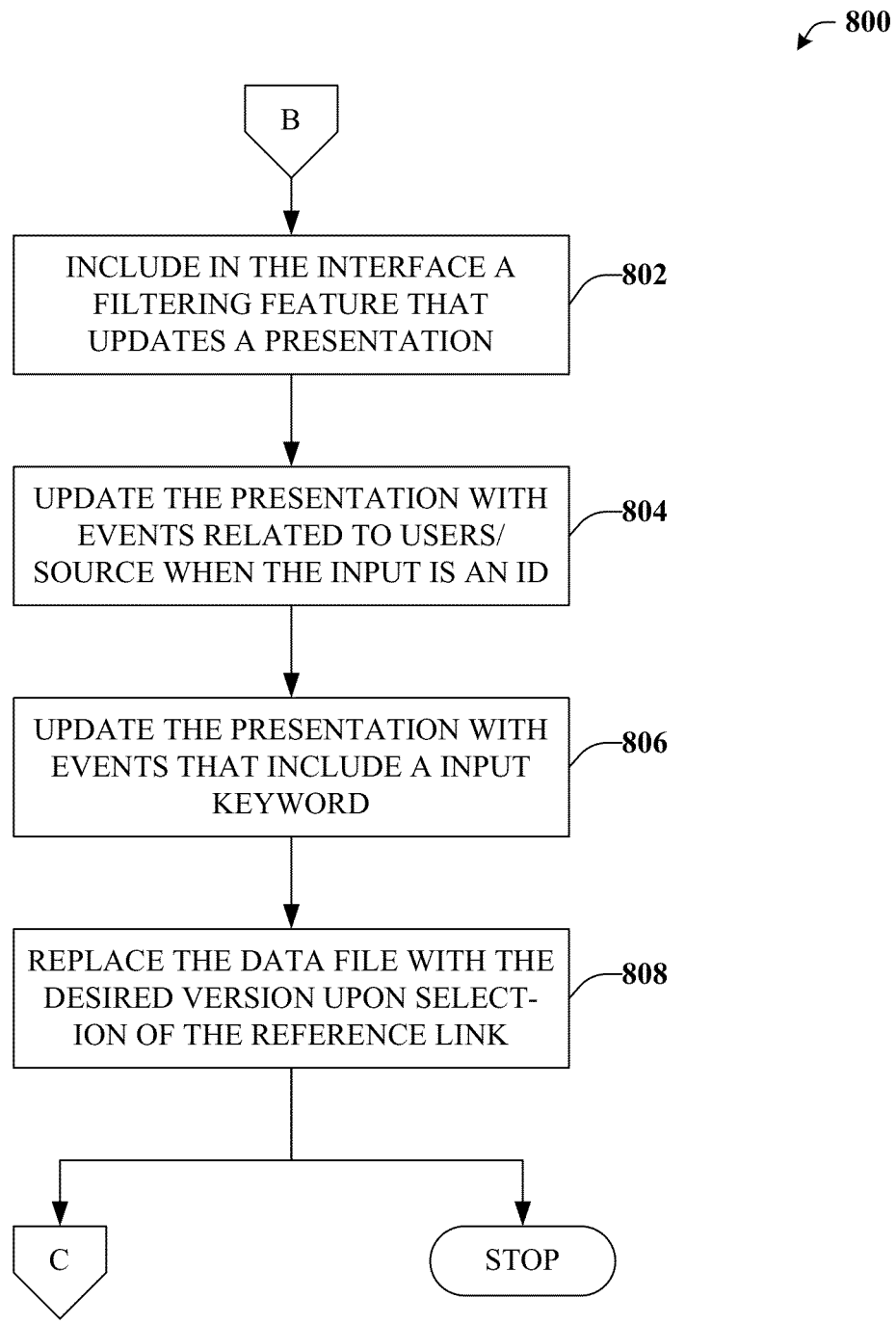
FIG. 8 illustrates an exemplary flow chart of procedures that define a method for providing additional features in connection with searching or filtering event-oriented contextual indicia.

With reference now to FIG. 8, method 800 for providing additional features in connection with searching or filtering event-oriented contextual indicia is illustrated. At reference numeral 802, a filtering feature that facilitates updates to a presentation of the subset of contextual event descriptions can be included in the graphic user interface provided with respect to reference numeral 606. Appreciably, the filtering feature can provide one or more mechanisms (e.g., a text box, a selection menu . . . ) for receiving input by way of the interface, and the updating can be performed based upon such input.

More particularly, at reference numeral 804, the input can be associated with a particular user ID, a group ID, or a source ID, respectively. In those cases, the presentation of the subset can be updated with contextual event descriptions related only to a particular user (e.g., based on user ID), a particular group of users (e.g., based on group ID), or a particular source (e.g., based on source ID) from which contextual event descriptions are obtained.

Furthermore, at reference numeral 806, the presentation of the subset can be updated with contextual event descriptions that include a particular keyword when, e.g., the input is identical to or similar to the keyword. It should be appreciated that regardless of which input mechanism or input type is employed for updating the presentation, the filtered subset can also include contextual event descriptions in which the underlying event described by those descriptions occurred at about the same time. This can be the case even though they do not satisfy the input.

Moreover, given that a reference link to a desired version of the data file can be included in the subset as discussed in connection with reference numeral 608, at reference numeral 808, the data file can be replaced with the desired version of the data file upon selection of the reference link, for example, by way of a mouse-click on the reference link display by the graphic user interface. In other words, the current version of the data file on, e.g., a local machine can be replaced with the selected version from the backup data store.

Figure 9:
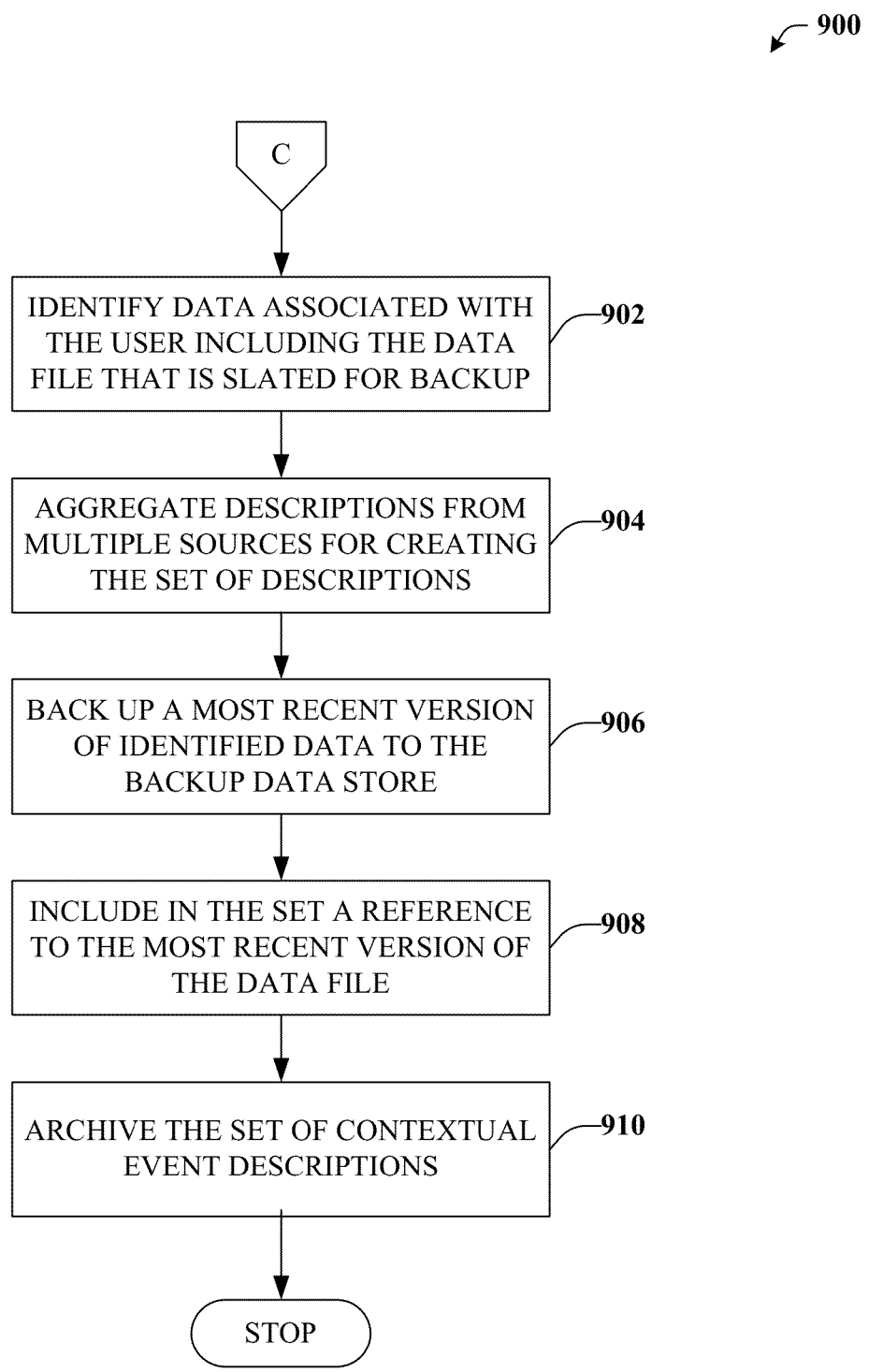
FIG. 9 depicts an exemplary flow chart of procedures defining a method for providing additional features in connection with employing event-oriented contextual indicia with respect specifically to archival of data.

With reference now to FIG. 9, method 900 for providing additional features in connection with employing event-oriented contextual indicia with respect specifically to archival of data is depicted. At reference numeral 902, data associated with the user that is slated or designated for backup can be identified. The identified data can be or include the data file introduced at reference numeral 602.

Additionally, at reference numeral 904, contextual event descriptions can be aggregated for constructing the set of contextual event descriptions substantially similar to that described with reference to reference numeral 606. It should be appreciated that the set can be aggregated from multiple sources such as those detailed in connection with reference numerals 702 or 704. Furthermore, each member of the set (e.g., each contextual event description) can include a summary or description of a respective event associated with a context of the user at about the time in which the data file was backed up.

Typically, the point in time in which a backup is initiated, the data that is being backed up is generally the most current version. Thus, at reference numeral 906, a most recent version of the identified data can be backed up to the backup data store discussed in connection with reference numeral 602. At reference numeral 908, a reference substantially similar to or representative of the reference link detailed in connection with reference numerals 608 or 808 can be included in the set of contextual event descriptions. In this case, the reference can refer to the most recent version. Accordingly, at reference numeral 910, the set of contextual event descriptions can be archived to the backup data store, potentially with the included reference information.

Figure 10:
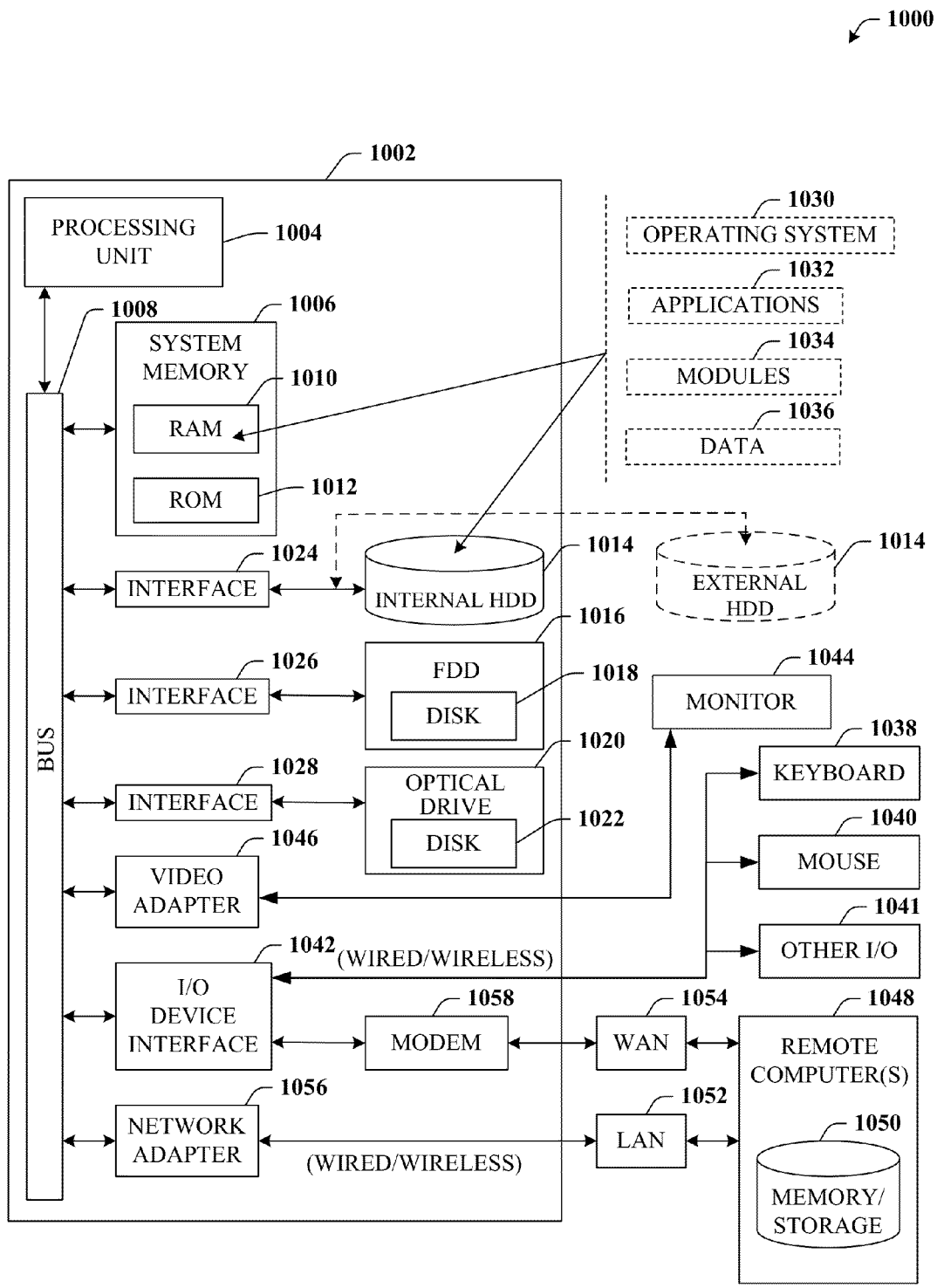
FIG. 10 illustrates a block diagram of a computer operable to execute or implements all or portions of the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, micro-processor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices 1041 may include a speaker, a microphone, a camera or another imaging device, an IR remote control, a joystick, a game pad, a stylus pen, touch screen, or the like. These and other input devices are often connected to the processing unit 1004 through an input-output device interface 1042 that can be coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, a mobile device, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 10 Mbps (802.11b) or 54 Mbps (802.11g) data rate, for example, or with products that contain both bands (dual band), so the networks can provide real-world performance similar to the basic "10BaseT" wired Ethernet networks used in many offices.

Figure 11:
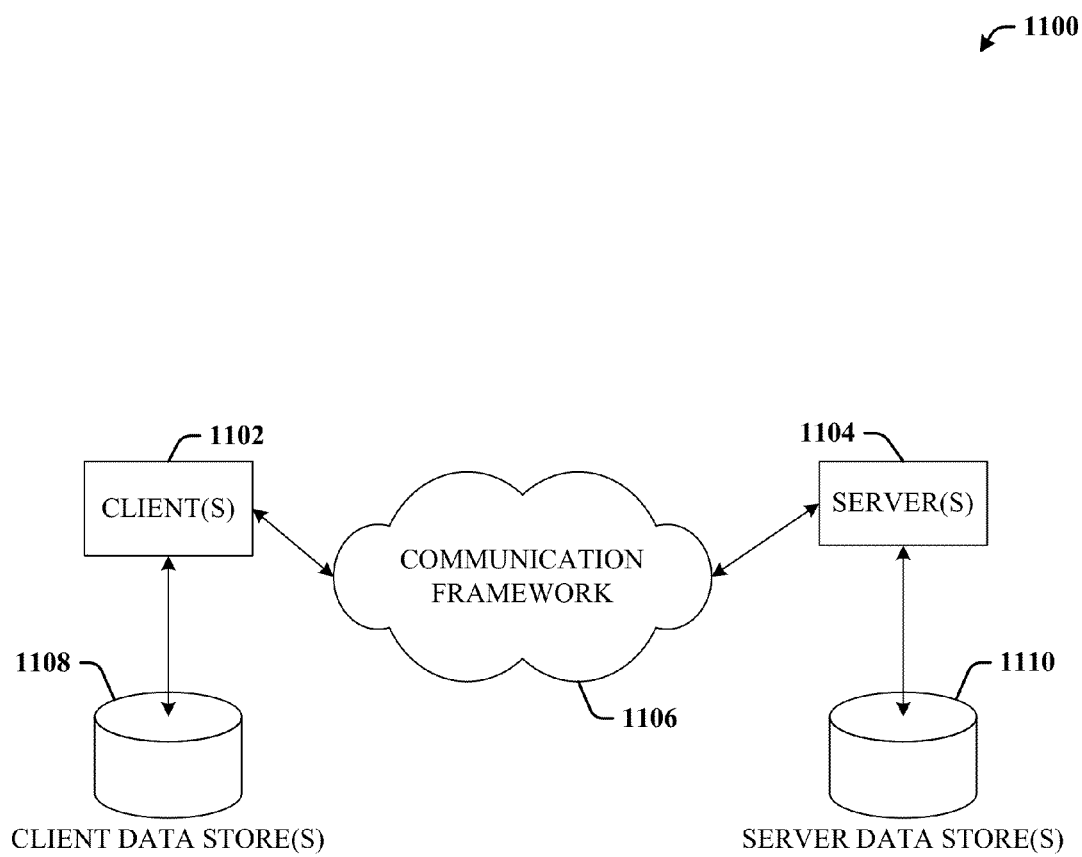
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A memory having computer-executable instructions stored therein, wherein in response to execution the computer-executable instructions enable performance of operations that restore data to a computing system, the operations comprising:
   receiving, from a data store, information regarding multiple backed-up versions of a data file;
   presenting, on a display device, a plurality of contextual event descriptions, wherein each contextual event description of the plurality includes information regarding an event from a user's calendar and information that correlates the event to a corresponding version of the data file from the multiple backed-up versions of the data file, and wherein the corresponding version of the data file was backed up in temporal proximity to the event;
   receiving an indication that represents selection of a particular version of the data file corresponding to a particular contextual event description of the plurality of contextual event descriptions; and
   restoring the particular version of the data file to a computing system.

2. The memory of claim 1, wherein each contextual event description of the plurality also includes information regarding a context of the user near to a time the corresponding version of the data file was backed up.

3. The memory of claim 1, wherein: the user's calendar includes information from a social networking service feed associated with the user; and at least one other contextual event description of the plurality is displayed based on information obtained from the social networking service feed associated with the user.

4. The memory of claim 1, wherein restoring the particular version of the data file includes: restoring the particular version of the data file to a shared folder or directory to which a second user has write privileges.

5. The memory of claim 1, wherein presenting the plurality of contextual event descriptions includes: filtering contextual event descriptions based upon a parameter; and presenting a subset of the filtered contextual event descriptions as the plurality of contextual event descriptions.

6. The memory of claim 1, wherein the operations further comprise: facilitating a backup of another version the data file prior to restoring the particular version of the data file.

7. The memory of claim 1, wherein the operations further comprise: inferring states of the computing system, an environment, or the user based on a set of observations as captured via events or event data; and constructing new events based on inferences by the inferring.

8. A computing device for restoring backed up data, the computing device comprising:
   at least one memory and at least one processor that respectively store and execute instructions to:
   receive, from a data store, information regarding multiple backed-up versions of a data file;
   present a plurality of contextual event descriptions, wherein each contextual event description of the plurality includes information regarding an event from a user's calendar and information that correlates the event to a corresponding version of the data file from the multiple backed-up versions of the data file, and wherein the corresponding version of the data file was backed up in temporal proximity to the event;
   receive an indication of a selection of a particular version of the data file corresponding to a particular contextual event description of the plurality of contextual event descriptions or of the particular contextual event description; and
   restore the particular version of the data file.

9. The computing device of claim 8, wherein each contextual event description of the plurality also includes information regarding a context of the user near to a time the corresponding version of the data file was backed up.

10. The computing device of claim 8, wherein: the user's calendar includes information from a social networking service feed associated with the user; and at least one other contextual event description of the plurality is displayed based on information obtained from the social networking service feed associated with the user.

11. The computing device of claim 8, wherein the restoration of the particular version of the data file includes: restoring the particular version of the data file to a shared folder or directory to which a second user has write privileges.

12. The computing device of claim 8, wherein the presentation of the plurality of contextual event descriptions includes: filtration of contextual event descriptions based upon a parameter; and presentation of a subset of the filtered contextual event descriptions as the plurality of contextual event descriptions.

13. The computing device of claim 8, wherein the at least one memory and the at least one processor also respectively store and execute instructions to: facilitate a backup of another version the data file prior to the restoration of the particular version of the data file.

14. The computing device of claim 8, wherein the at least one memory and the at least one processor also respectively store and execute instructions to: infer states of a computing system, an environment, or the user based on a set of observations as captured via events or event data; and construct new events based on inferences by the inferring.

15. A memory having instructions stored therein for archiving data, the instructions, in response to execution, enabling operations that comprise:
  identifying data designated for backup;
  logging at least one contextual event description as being associated with the data designated for backup, wherein each of the at least one contextual event descriptions includes information regarding an event from a user's calendar that is substantially contemporaneous to the logging of the at least one contextual event description;
  archiving a current version of the identified data designated for backup to a backup data store; and
  archiving a log of at least a portion of the logged at least one contextual event description in association with the current version of the identified data designated for backup.

16. The memory of claim 15, wherein the operations further comprise: aggregating additional contextual event descriptions from multiple social networking service feeds.

17. The memory of claim 15, wherein the operations further comprise: aggregating additional contextual event descriptions from one or more scheduling or itinerary applications.

18. The memory of claim 15, wherein the log includes a contextual event description having a reference to the current version of the identified data designated for backup.

19. The memory of claim 15, wherein one or more of the at least one contextual event descriptions also includes information regarding a context of the user at a time substantially contemporaneous to the archiving of the current version of the identified file.

20. The memory of claim 15, wherein: one or more of the contextual event descriptions includes information from a social networking service feed associated with the user.

* * * * *